(12) United States Patent
Ma (10) Patent No.: US 10,434,855 B1
(45) Date of Patent: Oct. 8, 2019

(54) LATCH ASSEMBLY AND TONNEAU COVER

(71) Applicant: Winbo-Dongjian Automotive Technology Co. Ltd., Foshan (CN)

(72) Inventor: Yongtao Ma, Foshan (CN)

(73) Assignee: Winbo-Dongjian Automotive Technology Co. Ltd., Foshan (CN)

( * ) Notice: Subject to any disclaimer, the term of this patent is extended or adjusted under 35 U.S.C. 154(b) by 8 days.

(21) Appl. No.: 15/928,545

(22) Filed: Mar. 22, 2018

(51) Int. Cl.
*B60J 7/19* (2006.01)
*B60J 7/16* (2006.01)

(52) U.S. Cl.
CPC .............. *B60J 7/198* (2013.01); *B60J 7/1607* (2013.01)

(58) Field of Classification Search
CPC ................................ B60J 7/198; B60J 7/1607
USPC ..................................... 296/100.02
See application file for complete search history.

(56) References Cited

U.S. PATENT DOCUMENTS

| | | | |
|---|---|---|---|
| 5,427,428 A * | 6/1995 | Ericson | B60J 7/141 160/231.1 |
| 6,000,744 A * | 12/1999 | Kooiker | B60J 7/141 296/100.09 |
| 6,302,468 B1 * | 10/2001 | Steadman | B60J 7/041 296/100.04 |
| 6,382,699 B1 * | 5/2002 | Hanson | B60J 7/141 296/100.07 |
| 6,641,200 B2 * | 11/2003 | Rusu | B60J 7/1621 296/100.07 |
| 7,093,881 B2 * | 8/2006 | Rusu | B62D 25/10 296/100.02 |
| 7,188,888 B2 | 3/2007 | Wheatley et al. | |
| 7,252,322 B2 * | 8/2007 | Rusu | B60J 7/1621 296/100.07 |
| 7,334,830 B2 | 2/2008 | Weldy | |
| 7,452,024 B2 * | 11/2008 | Landrith | B60J 7/041 296/100.04 |
| 8,205,928 B2 | 6/2012 | Steffens et al. | |
| 8,256,824 B2 | 9/2012 | Williamson et al. | |
| 9,290,122 B2 | 3/2016 | Spencer | |
| 9,533,555 B2 | 1/2017 | Facchinello et al. | |
| 9,545,835 B2 | 1/2017 | Facchinello et al. | |
| 9,630,479 B2 | 4/2017 | Facchinello et al. | |
| 9,669,689 B2 | 6/2017 | Steffens et al. | |
| 2016/0200375 A1 * | 7/2016 | Kerr, III | B60J 7/141 296/100.07 |
| 2017/0361692 A1 * | 12/2017 | Corder | B60J 7/198 |

\* cited by examiner

Primary Examiner — Pinel E Romain
(74) Attorney, Agent, or Firm — Eric J. Sosenko; Jonathan P. O'Brien; Honigman LLP (57) ABSTRACT

A tonneau cover for covering the cargo box of a pickup truck. The tonneau cover includes a cover assembly and at least one latch assembly including a striker subassembly and a latch subassembly. The striker subassembly is integrated into the cover assembly and includes a striker. The latch subassembly includes a clamp configured to attachment the latch subassembly to a sidewall of the cargo box. The latch subassembly also includes a latch arm and a latch hook. The latch arm is pivotally mounted to the clamp and the latch hook is connected to the latch arm at a location spaced apart from where the latch arm is pivotally mounted to the clamp. Provided at an end of the latch hook is a hook for releasable engagement with the striker.

23 Claims, 6 Drawing Sheets

LATCH ASSEMBLY AND TONNEAU COVER

BACKGROUND

1. Field of the Invention

The present invention generally relates to tonneau covers. More specifically, the invention relates to a latch assembly for selectively securing a tonneau cover to the cargo box of a pickup truck.

2. Description of Related Art

Tonneau covers are well known for covering the cargo boxes of pickup trucks to protect the contents of the cargo box from environmental factors and to enhance the aesthetics of the pickup truck. Generally, tonneau covers are movable so as to selectively close off or provide access to the cargo box, without requiring complete removal of the tonneau cover. In this regard, the tonneau covers are typically of a roll-up variety, a tilting variety or a folding variety.

Regarding the tiltable and foldable varieties, these tonneau covers typically include a frame disposed about the upper surfaces of the side and end rails of the cargo box with transverse rails extending between the side rails. If of the foldable variety, one or more hinged connections are provided in the frame to allow the frame to fold upon itself. This folding may be in multiple directions, but is typically in a direction from the tailgate toward the cab of the pickup truck.

To cover the open areas between the various frame members of the tonneau cover, the tonneau cover may be provided with a flexible cover extending over the entire frame. This is generally known as a soft-top tonneau cover. Alternatively, the tonneau cover may be provided with one or more rigid panels between the various frame members. This is often referred to as a hardtop tonneau cover. In either instance, a clamp assembly toward the rear of the tonneau cover, (generally adjacent to the tailgate) needs to be provided to quickly and easily engage with and disengage from the side rail of the cargo box, thereby providing quick access into or quick closure of the cargo box.

SUMMARY

In satisfying the above need, as well as overcoming various drawbacks and other limitations of the related art, the present invention provides a tonneau cover for covering the cargo box of a pickup truck.

In one aspect of the invention, the tonneau cover includes a cover assembly and at least one latch assembly including a striker subassembly and a latch subassembly. The striker subassembly is integrated into the cover assembly and includes a striker. The latch subassembly includes a clamp configured to attachment the latch subassembly to a sidewall of the cargo box. The latch subassembly also includes a latch arm and a latch hook. The latch arm is pivotally mounted to the clamp and the latch hook is connected to the latch arm at a location spaced apart from where the latch arm is pivotally mounted to the clamp. Provided at an end of the latch hook is a hook for releasable engagement with the striker.

In another aspect, the invention provides a tonneau cover for covering a cargo box of a pickup truck, the tonneau cover including a cover assembly configured to cover the cargo box of the pickup truck; and at least one latch assembly including a striker subassembly and a latch subassembly. The striker subassembly being integrated into the cover assembly and including a striker. The latch subassembly including a clamp, a latch arm and a latch hook. The clamp has first and second clamp members interconnected by at least one bolt and configured for attachment to a sidewall of the cargo box. The latch arm is pivotally mounted to the clamp, and the latch hook is formed at one end for releasable connection with the striker and is connected at the other end to the latch arm. The connection of the latch arm with the latch hook being at a location along the latch arm spaced apart from where the latch arm is pivotally mounted to the clamp.

In another aspect, the clamp is attached to the sidewall of the cargo box, the latch arm is pivotally mounted to one of the first and second clamp members.

In a further aspect, the latch hook includes a leg extending from the latch arm and terminating in one of a hook or clip.

In an additional aspect, the latch hook includes a rigid leg extending from the latch arm and terminating in one of a hook and clip.

In yet another aspect, the latch hook includes a pair of spaced legs extending from the latch arm and each of the legs terminates in one of a hook or clip.

In still a further aspect, the hooks are interconnected at distal ends thereof by a crossbar.

According to an additional aspect, the latch hook is unitarily constructed.

In still another aspect, the legs connect to the latch arm on opposing sides of the latch arm.

According to a further aspect, the legs are rigid.

In still an additional aspect, the latch arm is moveable between first and second positions.

According to another aspect, the latch hook is pivotally connected to the latch arm.

In yet a further aspect, the latch arm is pivotally mounted to the clamp at a first location and latch hook is connected to the latch arm at a location that rotates about the first location as the latch arm is moved between the first and second positions.

In an additional aspect, the latch arm is pivotally mounted to the clamp at a first location and latch hook is connected to the latch arm at a location that rotates about the first location as the latch arm is moved between the first and second positions.

In a further aspect, the first and second clamp members are pivotally engaged and one of the first and second clamp members includes a pivot received in a recess of the other of the first and second clamp members.

In another aspect, the first and second clamp members are configured for attachment to the sidewall of the cargo box by engagement with the sidewall between opposing faces of the first and second clamp members.

In still an additional aspect, the latch arm is non-metal.

In yet another aspect, the clamp is metal.

In a further aspect, the striker is moveable between a stowed position and a non-stowed position, in the stowed position, the striker extending parallel to the cover assembly.

In an additional aspect, the striker is pivotably mounted relative to the cover assembly.

In another aspect, the striker subassembly include a striker base supporting the striker, the striker being moveable relative to the striker base between a stowed position and a non-stowed position In a further aspect, the stowed position the striker is wholly positioned within the striker base.

In an additional aspect, the striker base includes a retainer, the retainer engaging and retaining the striker in the stowed position.

According to another aspect of the invention, a tonneau cover is provided for covering the cargo box of a pickup truck. The tonneau cover includes a cover configured to cover the cargo box of the pickup truck and at least one latch assembly including a striker subassembly and a latch subassembly. The striker subassembly is integrated into the cover assembly and includes a striker. The latch subassembly includes a clamping means for attaching the latch subassembly to a sidewall of the cargo box of the pickup truck, and a latching means supported by the clamping means and being moveable between first and second positions for releasably engagement with the striker.

Further objects, features and advantages of this invention will become readily apparent to persons skilled in the art after review of the following description with reference to the drawings and the claims that are appended to and form a part of this specification

DETAILED DESCRIPTION

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" or "inner" and "outward" or "outer" indicate a direction that is generally toward or away from a central axis of the referred to part whether or not such an access is designated in the figures. An axial surface is therefore one that faces in the axial direction. In other words, an axial surface faces in a direction along the central axis. A radial surface therefore faces radially, generally away from or toward the central axis. It will be understood, however, that in actual implementation, the directional references used herein may not necessarily correspond with the installation and orientation of the corresponding components or device.

Figure 1:
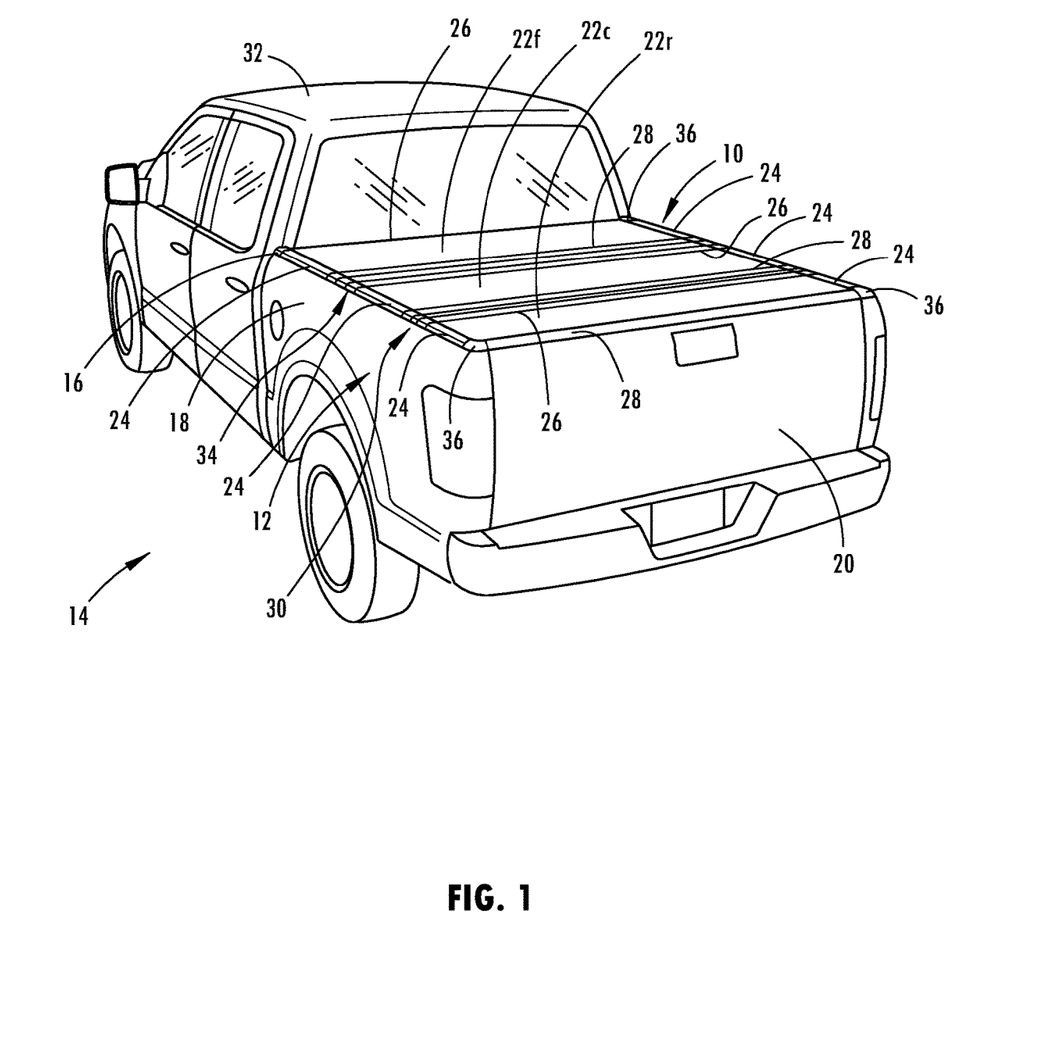
FIG. 1 is a perspective view of a pickup truck with tonneau cover positioned over the cargo box of the pickup truck.

Referring now to the drawings, a tonneau cover is shown therein and designated at 10. As seen in FIG. 1, the tonneau cover 10 is disposed on the upper surfaces 16 of the sidewalls 18, including the tailgate 20, that define the cargo box 12 of the pickup truck 14 and covers the bed or cargo box 12 of the pickup truck 14. The tonneau cover 10 may be one of the folding or tilting varieties mentioned above. Merely for the purposes of the following discussion and not to be limited thereby, the tonneau cover 10 will be described as a folding hardtop variety.

Figure 2:
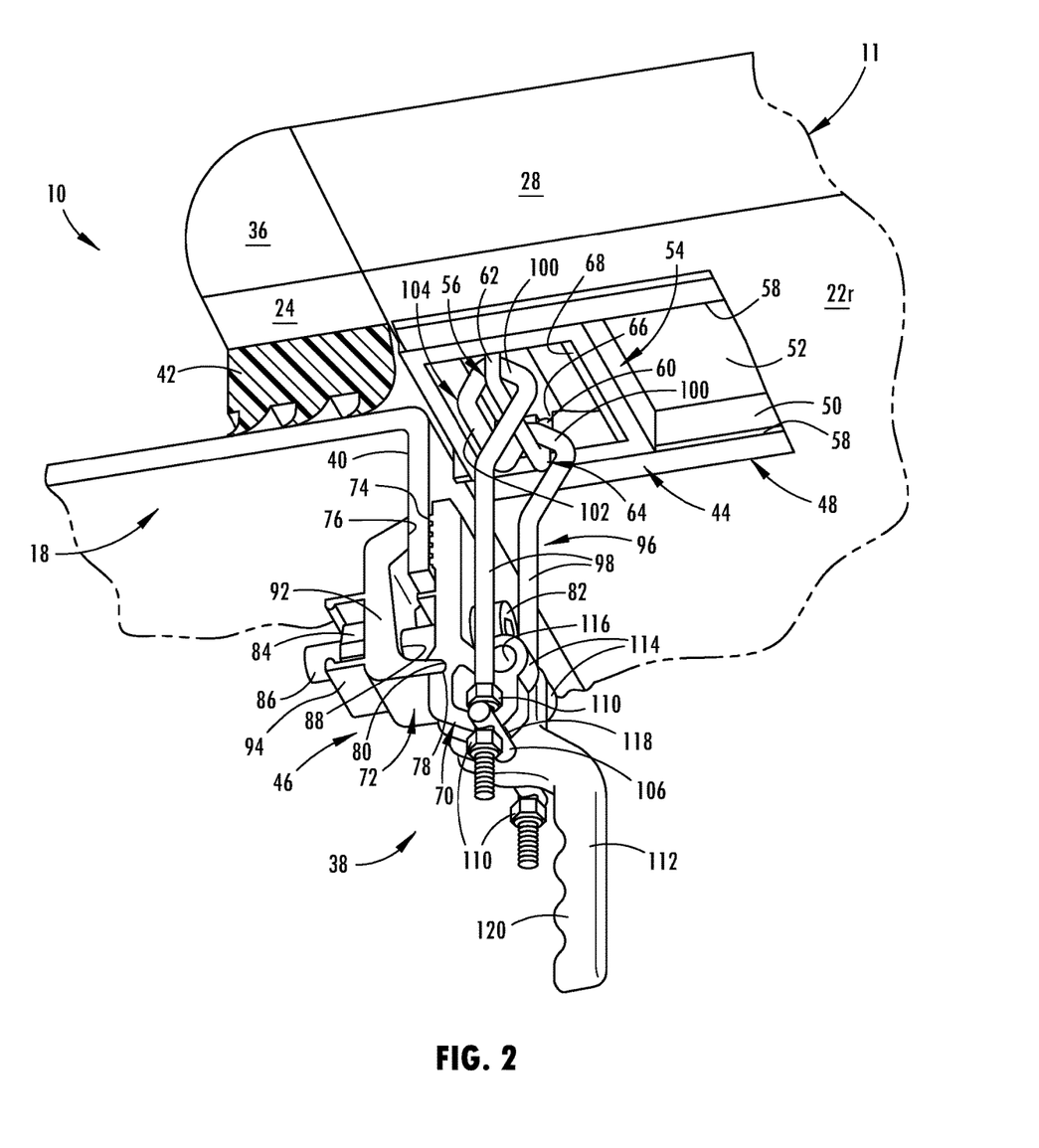
FIG. 2 is bottom, partial perspective view of the latch assembly of the tonneau cover seen in FIG. 1, with the clamp assembly in the latched condition.

The tonneau cover 10 includes a plurality of individual panels 22, each of which has a substantially rectangular configuration. As illustrated, the tonneau cover 10 is a tri-fold tonneau cover, meaning that it is comprised of three panels 22 that are foldable over one another so as to selectively cover some or substantially all of the cargo box 12. As referred to herein, panel 22r is the first, rear or tailgate-end panel; panel 22c is the second, center or middle panel; and panel 22f is the third, front or cab-end panel of the tonneau cover 10. The tonneau cover 10, as seen in FIGS. 1 and 2, is fully unfolded and in its fully extended position. In this position, the tonneau cover 10 fully or substantially covers the opening of the cargo box 12.

In the folded position, the rear panel 22r is folded onto the center panel 22c, and then both of those panels 22r, 22c can be folded on the front panel 22f Since the folding capability of the tonneau cover 10 is not the particular focus hereof, the folded position of the tonneau cover 10 is not illustrated in connection with the present description. Notwithstanding this, in the interest of completeness, general aspects of the tonneau cover 10, and its ability to fold, are discussed below.

As noted above, the panels 22 are rigid structures. Accordingly, the panels 22 may be formed as composite structures through a variety of techniques that are well known to those skilled in field of tonneau covers. For example, the panels 22 may be comprised of solid upper and lower sheets of aluminum, between which an extruded polystyrene foam sheet core is provided. Since the particular construction of the panels 22 will vary based on the individual preferences of the manufacturer and the particular design criteria for the tonneau cover, further details regarding the specific construction of the panels 22 themselves are not provided herein.

Each panel 22 is bounded about its perimeter by a series of frame members, including a pair of side frame members 24, a front frame member 26 and a rear frame member 28. For the rear panel 22r, the rear frame member 28 is arranged to cooperate with the upper surface of the tailgate 20 and the front frame member 26 may form part of a rear hinge assembly 30. For the front panel 22f, the front frame member 26 is arranged to cooperate with the front side rail (not shown) of the cargo box 12, adjacent to the cab 32 of the pickup truck 14, while its rear frame member 28 may form part of a front hinge assembly 34. For the center panel 22c, the rear frame member 28 may form part of the rear hinge assembly 30, while the front frame member 26 may form part of the front hinge assembly 34. The hinge assemblies 30, 34 themselves may be of any of the well know varieties and, accordingly, are not further described herein.

At the corner intersections of the various frame members, corner members 36 interconnect the frame members 24, 26, 28 to one another.

The tonneau cover 10 includes two sets of clamp and/or latch assemblies, a pair of front assemblies (not shown) and a pair of rear assemblies. Front assemblies are provided as part of the front panel 22f and secure the front panel 22f to the side rails 18 of the cargo box 12. The rear assemblies are associated with the rear panel 22r and operate to secure the rear panel 22r to the side rails 18 of the cargo box 12. The front assemblies may be of the same or similar construction as that of the rear assemblies. Generally, however, the rear assemblies require a greater ease of operation since these assemblies must be disconnected in order for the tonneau cover 10 to be folded. The front assemblies, once installed, can remain installed until the tonneau cover 10 needs to be removed, unless, of course, the tonneau cover is designed such that the front panel 22f can be folded rearward. In that latter case, the front assemblies must also be readily and easily engaged and disengaged. In view the above, only the rear assemblies are discussed herein, it being understood that the front assemblies may have the same, a similar or different construction.

Referring now to FIG. 2, a latch assembly 38 is illustrated as securing the rear panel 22r of the cover assembly 11 (the tonneau cover 10 absent the latch assembly 38) to the cargo box 12, and more particularly the inner flange 40 of the sidewall 18 of the cargo box 12. While only one latch assembly 38 is shown, it will be understood that a second latch assembly 38 is located on opposing side of the panel 22r to secure the cover assembly 11 to the opposing side rail 18. Also seen in FIG. 2 is a perimeter seal 42 that, when the latch assembly 38 is engaged, prevents water, dirt, debris, etc. from penetrating into the cargo box 12 from between the cover assembly 11 and the upper surface 16 of the sidewalls 18.

As its two main subcomponents, the latch assembly 38 includes a striker subassembly 44 and a latch subassembly 46.

The striker subassembly 44 is secured to the rear panel 22r. The striker subassembly 44 may be secured directly to a surface of the rear panel 22r or, alternatively, may be secured within the recess of a channel 48 provided in the rear panel 22r. As seen in FIG. 2, the channel 48 includes opposing sidewalls 50 connected by a bottom wall 52 that cooperate to define defines a pocket within which the striker subassembly 44 is received. The striker subassembly 44 is principally composed of a striker base 54 and a striker 56. The striker base 54 engages the channel 48 so as to be either fixedly secured or slideably retained within the channel. When fixedly secured, threaded fasteners or other means the securement may be employed. When slideably retained, the sidewalls 58 of the striker base 54 are provided with a shape corresponding to the sidewalls 50 of the channel 48. The shape of the sidewalls 50, in that instance, may include opposed lips 58 or other features preventing the striker base 54 from being pulled downwardly (as oriented in the figures) out of engagement with the channel 48.

Figure 6:
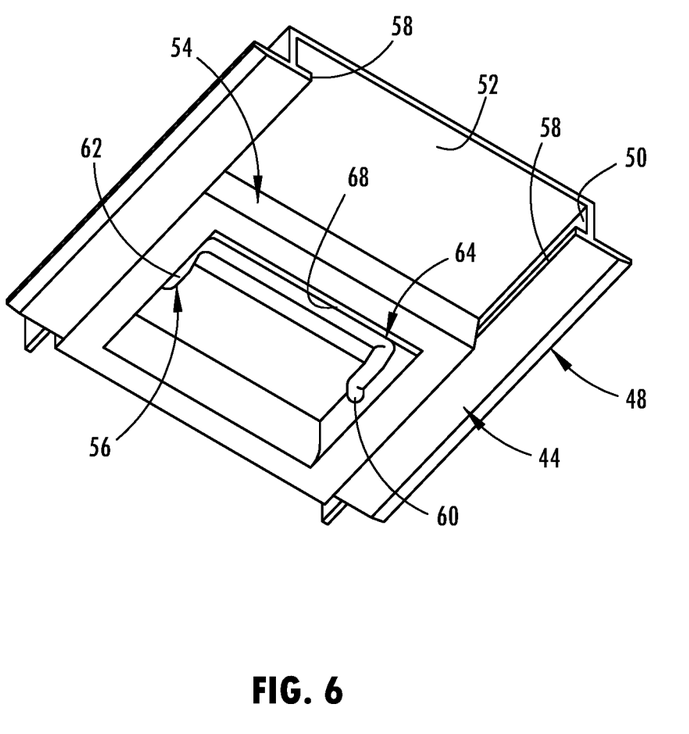
FIG. 6 is bottom perspective view, similar to that of FIG. 5, of the channel, striker and striker base, and showing the striker in the stowed position.

In a preferred embodiment, the striker 56 is mounted to the striker base 54 so as to define a loop with an open center. The striker 56 may constructed from a bar stock material formed into a U-shape. To engage the striker base 54, the striker 56 may include feet 60 extending laterally outward from the legs 62 of the U-shape, the latter of which are joined by a crossbar 64. The feet 60 of the striker 56 are received within slots 66 defined front upper surface and extending partway across the width of the striker base 54. Preferably, the feet 60 are loosely retained within the slots 66 allowing the striker 56 to pivot relative to the striker base 54. As seen in FIG. 6, such a construction allows striker 56 to be pivoted into a stowed position within the striker base 54 and the channel 48. This stowed position allows for the panels 22 of the cover assembly 11 to be folded upon one another without damage by contact with the striker 56. A retainer 68, formed as one or more protrusions from the inner perimeter of the striker base 54, may be provided to engage the crossbar 64 and secure the striker in the stowed position. Alternatively, the striker 56 may be provided with a single leg 62 and crossbar 64 or another construction allowing for engagement with features of the latch subassembly 46 as discussed below.

The latch subassembly 46 is secured to the sidewall 18 by inner and outer clamp members 70, 72, which are preferably made of metal or another rigid and strong material. In securing the latch subassembly 46, the inner flange 40 of the sidewall 18 is impinged between opposed faces 74, 76 of the inner and outer clamp members 70, 72. The faces 74, 76 may include surface enhancements, such as teeth, ribs, other projections, friction material or surface treatments, to increase engagement between the faces 74, 76 and the inner flange 40.

Retention in this fashion achieved by a pivot 78 of the outer clamp member 72 being received within a recess 80 of the inner clamp member and by engagement of a lock bolt 82 with a lock nut 84, the shaft 86 of the lock bolt 82 extending through apertures 88 defined in mounting portions 90, 92 of the inner and outer clamp members 70, 72. Because of the limited accessibility to the area within the sidewall 18 and adjacent to the inner flange 40, the mounting portion 92 of the outer clamp member 72 may be provided with flanges 94 or a collar, projecting outwardly from the mounting portion 92, that engage the lock nut 84 and prevent its rotation when the lock bolt 82 is threadably rotated therein.

The latch subassembly 46 engages the striker subassembly 44 through a latch hook 96. The latch hook 96 is preferably unitarily formed from bar stock and includes a pair of legs 98 each of which is provided with a return bend or hook 100 at one end. The hooks 100 of each of the legs 98 are joined together by a crossbar 102 and together form the hook end 104 of the latch hook 96. The width of the latch hook 96 in the vicinity of the hook end 104 is less than the width of the opening between the legs 62 of the striker 56. Accordingly, the hook end 104 may be extended through the opening of the striker 56 such that the crossbar 64 of the striker 56 is received within the concave interior of the hooks 100 of the hook end 104

The legs 98 of the latch hook 96 extend generally transversely away from the crossbar 102 and are interconnected at their opposing ends by a pivot bar 106. In this regard, the pivot bar 106 is provided with apertures 108 in its opposing ends and through which the legs 98 extend. A pair of nuts 110 are threadably received on the ends of each of the legs 98 and are provided so as to be on opposing sides of the pivot bar 106. Accordingly, the nuts 110 are utilized to fix the position of the pivot bar along the length of the legs 98.

In an alternative construction, the latch hook 96 may be formed with a single leg 98 with the hook 100 or clip or other attachment feature at the end thereof. Additionally, the leg(s) 98 may be flexible and not rigid or may be resilient.

Pivotally mounted to the inner clamp member 70 is a latch arm 112, which in the preferred embodiment is constructed of plastic, but which may be constructed of metal, rubber other material. To provide for this pivotable mounting, a bore is provided in one end, the upper end, of the latch arm 112. This end of the latch arm 112 is received between a pair of pivot bosses 114, each of which includes a bore aligned with the bore in the latch arm 112. Having an axis generally parallel to the sidewall 18 of the cargo box, a pivot axle 116 extends through the bore of one pivot boss 114, into the bore of the latch arm 112 and further into the bore of the other pivot boss 114. The pivot axle 116 may be may be press-fit or otherwise engaged within the bores of the pivot bosses 114 to securely retain the pivot axle 116 therein. Pivotally mounted to the inner clamp member 70 in this manner, the latch arm 112 is capable of pivoting generally perpendicularly or laterally relative to the sidewall 18 of the cargo box 12. At a location spaced apart from the pivot axle 116, the latch arm 112 includes a bore through which the pivot bar 106 rotatably extends, such that each leg 98 of latch hook 96 is located on an opposite side of the latch arm 112.

In an alternative embodiment, the latch arm 112 unitarily formed with the latch hook 96 of the various previously described embodiments.

Figure 3:
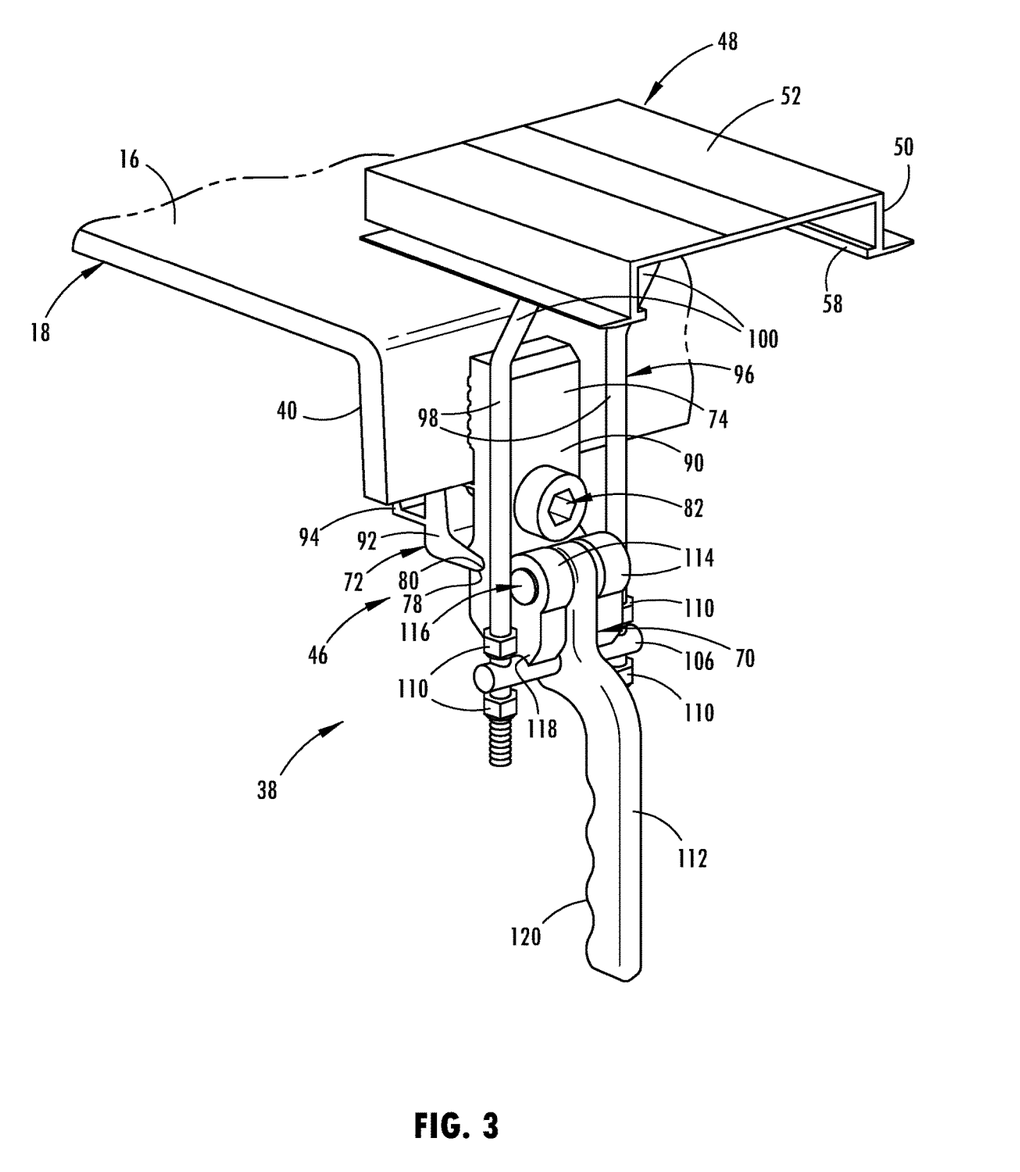
FIG. 3 is top perspective view of the latch assembly of the tonneau cover seen in FIG. 1, with the cover assembly removed.
Figure 4:
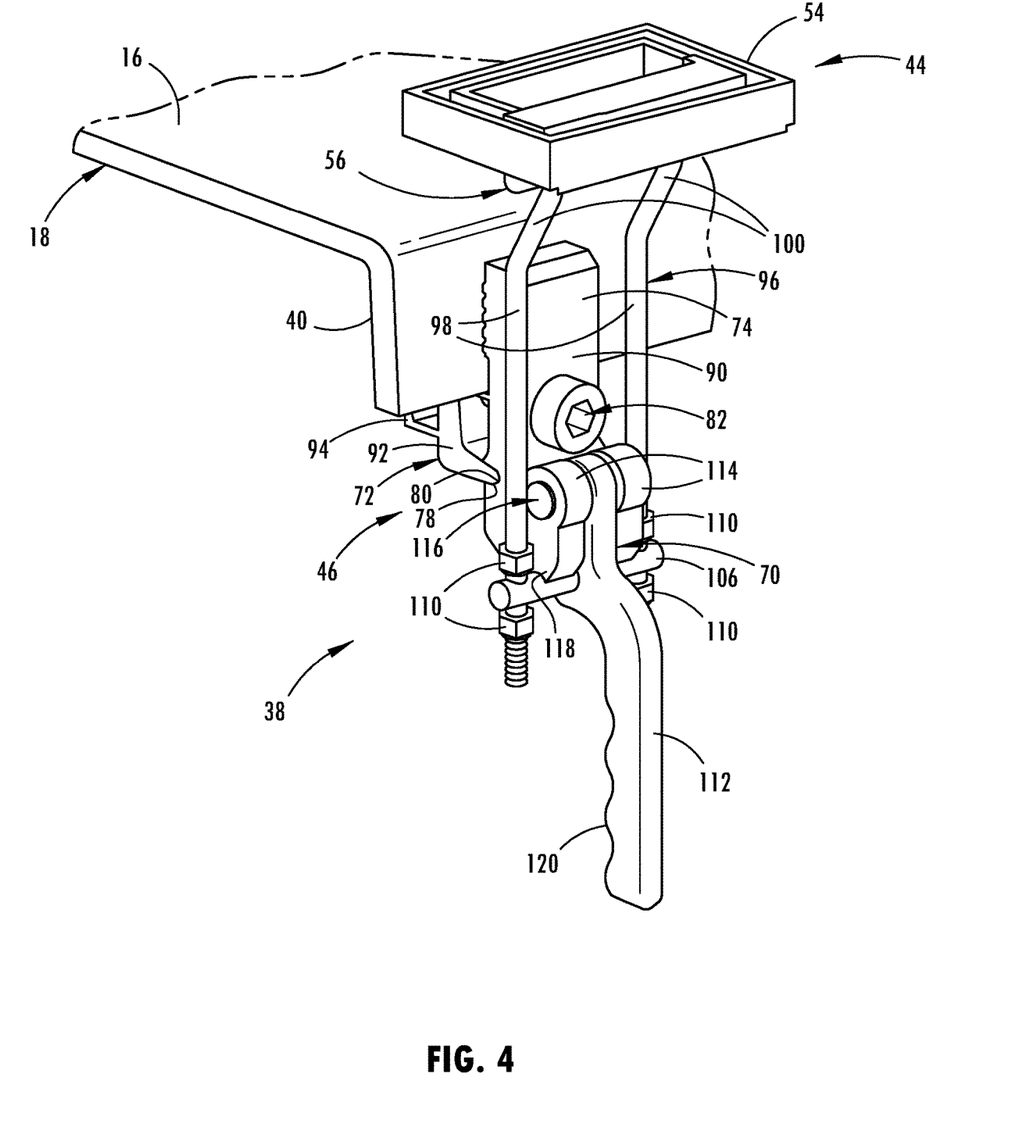
FIG. 4 is a top perspective view of the latch assembly, seen in FIG. 3, with the channel that houses the striker and striker base removed.
Figure 5:
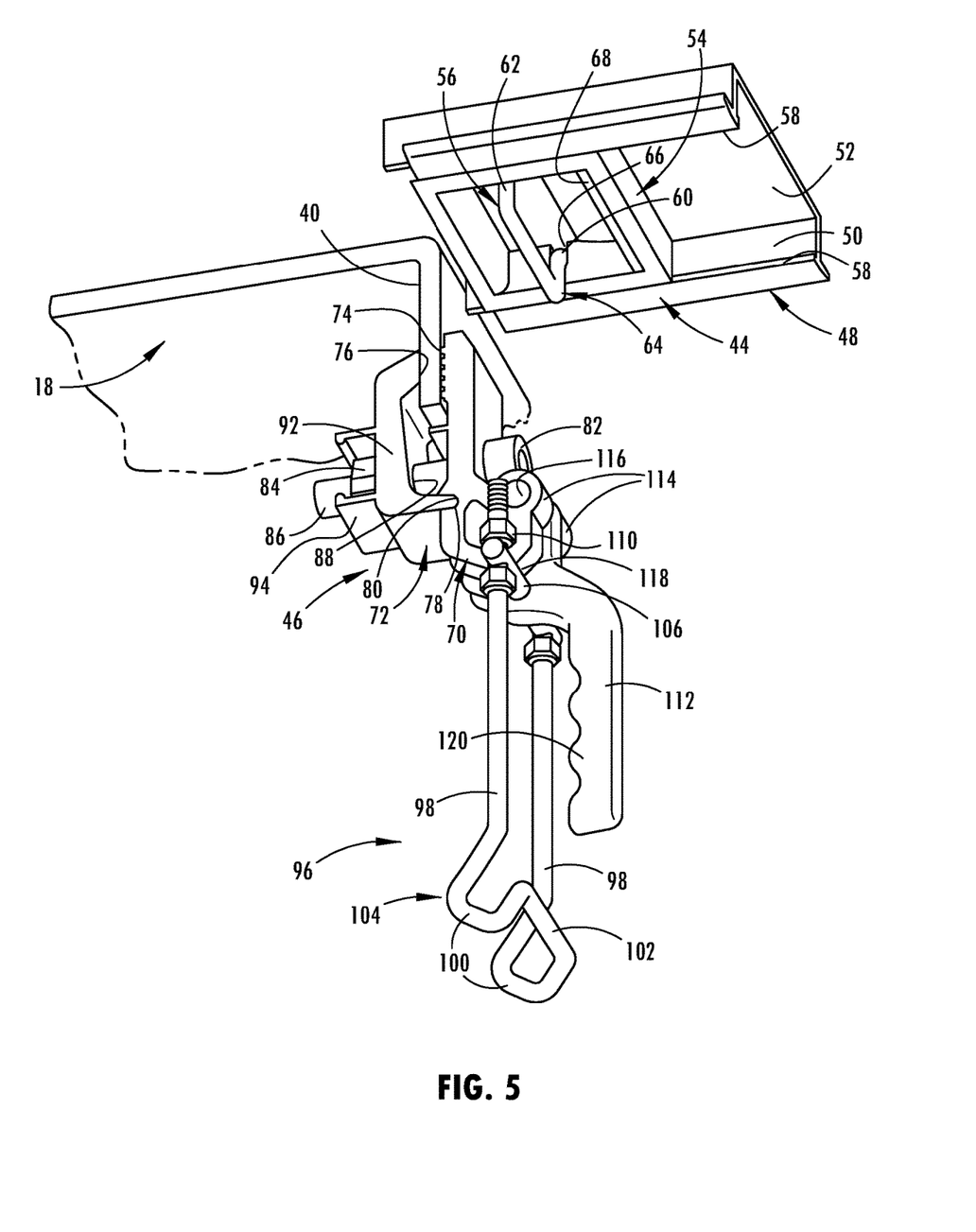
FIG. 5 is a bottom perspective view of the latch assembly, seen in FIG. 3, in the unlatched condition.

Upon rotation of the latch arm 112 about the pivot axle 116 from the location seen FIGS. 2-4, the pivot bar 106 and the legs 98 of the latch hook 96 are generally moved toward the interior of the cargo box 12. Since latch arm 112 is pivotally connected to the inner clamp member 70 at its upper end and the pivot bar 106 extends through the latch arm 112 at a location spaced apart from that upper end, the pivot bar 106 rotates upwardly as it is moved inwardly. This upward rotation lifts the legs 98 of the latch hook 96 causing the hook end 104 to be lifted from the crossbar 64 of the striker 56 and moved toward the bottom wall 52 of the channel 48. The return bends of the hooks 100 are dimensioned such that, when sufficiently lifted by rotation of the latch arm 112, the crossbar 102 of the hook end 104 can be rotated through the opening defined by the striker 56 and out of engagement with the striker subassembly 54.

As will be appreciated from the above discussion, the downward force exerted upon the cover assembly latch assembly 38 may be adjusted by raising the lowermost nuts 110 along the legs 98 of the latch hook 96. Once this tension adjustment has been made, the upper nuts 110 may be tightened downward to lock the position of the latch hook 96 relative to the latch arm 112 and inner clamp member 70.

The inner clamp member 70 is further provided on a lower end thereof with a depression or recess 118. This recess is preferably located substantially vertically beneath or slightly outward of the pivot axle 116.

During downward rotation of the latch arm 112 to engage the latch hook 96 with the striker 56, the relative locations of the pivot axle 116 and the passage of the pivot bar 106 through the latch arm 112 cause the pivot bar 106 to be rotatably be received into the recess 118, and therefore located substantially directly below or outward of the pivot axle 116. The upward force inherently exerted by the cover assembly 11 thus operates to provide a biasing force that retains the pivot bar 106 within the recess 118, until purposely moved therefrom by inward rotation of the latch arm 112.

When the latch hook 96 is disengaged from the striker subassembly 44, the pivot bar 106 may also be received and retained in the recess 118. In this positions, because of pivot bar 106 is rotationally received through the latch arm 112, the latch hook 96 may be rotated 180 degrees and positioned with the hook ends 104 extending downward. If the rotational engagement between the pivot bar 106 and the latch arm 112 is not freely rotatable and is sufficiently, frictionally constrained, the latch hook 96 can be placed and retained in the downwardly extended position without excessive motion during operation of the pickup truck 14. A frictionally constrained bearing or fit between the pivot bar 106 and latch arm 112 is preferably provided for this purpose.

To facilitate rotation of the latch arm 112, the latch arm 112 may be provided with a handgrip 120 on its end opposite from the pivot axle 116.

With the above construction, the tonneau cover 10 is provided with a latch assembly 38 in which the latch subassembly 46 is mounted to and retain with cargo box 12 of the pickup truck 14 when the cover assembly 11 is opened and in its folded position. This has the benefit of placing less weight and stress on the cover assembly 11, as well as providing a simpler structure, the striker subassembly 44, on the cover assembly 11 that is easily and readily moved into its stowed position and less likely to be inadvertently damaged or cause damage if the cover assembly 11 is folded without the striker subassembly 44 in its stowed position. The above benefits are contrary to the conventional constructions employed with present-day tonneau covers.

As a person skilled in the art will really appreciate, the above description is meant as an illustration of at least one implementation of the principles of the present invention. This description is not intended to limit the scope or application of this invention since the invention is susceptible to modification, variation and change without departing from the spirit of this invention, as defined in the following claims.

I claim:

1. A tonneau cover for covering a cargo box of a pickup truck, the tonneau cover comprising:
   a cover assembly configured to cover the cargo box of the pickup truck; and
   at least one latch assembly including a striker subassembly and a latch subassembly,
      the striker subassembly being integrated into the cover assembly and including a striker,
      the latch subassembly including a clamp,
         the clamp having first and second clamp members interconnected by at least one bolt and configured for attachment to a sidewall of the cargo box,
      the latch subassembly also including a latch arm and a latch hook,
         the latch arm being pivotally mounted to the clamp,
         the latch hook being formed at one end for releasable connection with the striker and being connected at the other end to the latch arm, the connection of the latch arm with the latch hook being at a location along the latch arm spaced apart from where the latch arm is pivotally mounted to the clamp.

2. The tonneau cover according to claim 1, wherein, when the clamp is attached to the sidewall of the cargo box, the latch arm is pivotally mounted to one of the first and second clamp members.

3. The tonneau cover according to claim 1, wherein the latch hook includes a leg extending from the latch arm and terminating in one of a hook or clip.

4. The tonneau cover according to claim 1, wherein the latch hook includes a rigid leg extending from the latch arm and terminating in one of a hook and clip.

5. The tonneau cover according to claim 1, wherein the latch hook includes a pair of spaced legs extending from the latch arm and each of the legs terminates in one of a hook or clip.

6. The tonneau cover according to claim 5, wherein the hooks are interconnected at distal ends thereof by a crossbar.

7. The tonneau cover according to claim 6, wherein the latch hook is unitarily constructed.

8. The tonneau cover according to claim 5, wherein the legs connect to the latch arm on opposing sides of the latch arm.

9. The tonneau cover according to claim 5, wherein the legs are rigid.

10. The tonneau cover according to claim 1, wherein the latch arm is moveable between first and second positions.

11. The tonneau cover according to claim 10, wherein the latch hook is pivotally connected to the latch arm.

12. The tonneau cover according to claim 11, wherein the latch arm is pivotally mounted to the clamp at a first location and latch hook is connected to the latch arm at a location that rotates about the first location as the latch arm is moved between the first and second positions.

13. The tonneau cover according to claim 10, wherein the latch arm is pivotally mounted to the clamp at a first location and latch hook is connected to the latch arm at a location that rotates about the first location as the latch arm is moved between the first and second positions.

14. The tonneau cover according to claim 1, wherein the first and second clamp members are pivotally engaged and one of the first and second clamp members includes a pivot received in a recess of the other of the first and second clamp members.

15. The tonneau cover according to claim 1, wherein the first and second clamp members are configured for attachment to the sidewall of the cargo box by engagement with the sidewall between opposing faces of the first and second clamp members.

16. The tonneau cover according to claim 1, wherein the latch arm is non-metal.

17. The tonneau cover according to claim 1, wherein the clamp is metal.

18. The tonneau cover according to claim 1, wherein the striker is moveable between a stowed position and a non-stowed position, in the stowed position, the striker extending parallel to the cover assembly.

19. The tonneau cover according to claim 1, wherein the striker is pivotably mounted relative to the cover assembly.

20. The tonneau cover according to claim 1, wherein the striker subassembly include a striker base supporting the striker, the striker being moveable relative to the striker base between a stowed position and a non-stowed position.

21. The tonneau cover according to claim 20, wherein in the stowed position the striker is wholly positioned within the striker base.

22. The tonneau cover according to claim 20, wherein the striker base includes a retainer, the retainer engaging and retaining the striker in the stowed position.

23. A tonneau cover for covering a cargo box of a pickup truck, the tonneau cover comprising:
   a cover configured to cover the cargo box of the pickup truck; and
   at least one latch assembly including a striker subassembly and a latch subassembly,
      the striker subassembly integrated into the cover assembly and including a striker,
      the latch subassembly including
         clamping means for attaching the latch subassembly to a sidewall of the cargo box of the pickup truck,
         latching means supported by the clamping means and being moveable between first and second positions for releasably engagement with the striker.

* * * * *